(12) United States Patent
Wen et al.

(10) Patent No.: US 11,016,454 B2
(45) Date of Patent: May 25, 2021

(54) ENERGY CONTROL METHOD AND APPARATUS FOR POWER CONSUMPTION SYSTEM

(71) Applicant: GREE ELECTRIC APPLIANCES, INC. OF ZHUHAI, Zhuhai (CN)

(72) Inventors: Wu Wen, Zhuhai (CN); Peng Ren, Zhuhai (CN); Zhigang Zhao, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 96 days.

(21) Appl. No.: 16/335,727

(22) PCT Filed: Apr. 21, 2017

(86) PCT No.: PCT/CN2017/081509
§ 371 (c)(1),
(2) Date: Mar. 22, 2019

(87) PCT Pub. No.: WO2018/082270
PCT Pub. Date: May 11, 2018

(65) Prior Publication Data
US 2019/0250577 A1    Aug. 15, 2019

(30) Foreign Application Priority Data
Nov. 2, 2016    (CN) .......................... 201610943937.1

(51) Int. Cl.
*G05B 19/042* (2006.01)
*G08C 17/02* (2006.01)
(Continued)

(52) U.S. Cl.
CPC ........... *G05B 19/042* (2013.01); *G05B 19/04* (2013.01); *G08C 17/02* (2013.01); *G05B 15/02* (2013.01); *Y02P 90/02* (2015.11)

(58) Field of Classification Search
CPC ...... G05B 19/04; G05B 15/02; G05B 19/042; G08C 17/02; G08C 2201/93; H04Q 2209/40; H04Q 2209/60; H04Q 9/00
See application file for complete search history.

(56) References Cited

U.S. PATENT DOCUMENTS

| | | | |
|---|---|---|---|
| 7,320,078 B2* | 1/2008 | Balestriere | G06F 1/24 713/300 |
| 7,984,309 B2* | 7/2011 | Yamazaki | G06F 1/26 713/300 |

(Continued)

FOREIGN PATENT DOCUMENTS

| | | |
|---|---|---|
| CN | 1371541 A | 9/2002 |
| CN | 101055997 A | 10/2007 |

(Continued)

OTHER PUBLICATIONS

International Search Report dated Aug. 15, 2017 in PCT/CN2017/081509 (with English translation), 6 pages.

(Continued)

*Primary Examiner* — Chun Cao
(74) *Attorney, Agent, or Firm* — Oblon, McClelland, Maier & Neustadt, L.L.P.

(57) ABSTRACT

An energy control method and an energy control apparatus for a power consumption system. The energy control method includes: a step S100 in which the energy control apparatus receives a starting-up request signal to start a power consumption device; a step S200 of determining whether current power supply capacity of the power supply system meets a starting power requirement of the power consumption device to be started; and a step S300 of sending a starting-up signal to the power consumption device to be started and controlling the power supply system to supply power to the power consumption device to be started, if the current power supply capacity of the power supply system (Continued)

meets the starting power requirement of the power consumption device to be started; wherein the energy control method continues to make a determination as to whether the current power supply capacity of the power supply system meets the starting power requirement of the power consumption device to be started, if the current power supply capacity of the power supply system does not meet the starting power requirement of the power consumption device to be started. The active control over a grid is achieved by the energy control method of the energy control apparatus, so that the safety of the grid is guaranteed, and the stable and reliable operation is achieved.

10 Claims, 1 Drawing Sheet

(51) Int. Cl.
  G05B 19/04 (2006.01)
  G05B 15/02 (2006.01)

(56) References Cited

U.S. PATENT DOCUMENTS

| | | | | |
|---|---|---|---|---|
| 9,455,577 | B2* | 9/2016 | Bhageria | H02J 13/00006 |
| 2004/0230846 | A1* | 11/2004 | Mancey | H04L 12/40045 |
| | | | | 713/300 |
| 2012/0150359 | A1 | 6/2012 | Westergaard | |
| 2012/0330473 | A1* | 12/2012 | Meredith | H02J 13/0075 |
| | | | | 700/291 |
| 2015/0032278 | A1* | 1/2015 | Bhageria | H02J 4/00 |
| | | | | 700/295 |
| 2015/0134139 | A1 | 5/2015 | Westergaard | |
| 2016/0156185 | A1 | 6/2016 | Li et al. | |
| 2017/0372244 | A1 | 12/2017 | Westergaard | |

FOREIGN PATENT DOCUMENTS

| | | | |
|---|---|---|---|
| CN | 101800439 | A | 8/2010 |
| CN | 102903186 | A | 1/2013 |
| CN | 103472785 | A | 12/2013 |
| CN | 103676846 | A | 3/2014 |
| CN | 105527847 | A | 4/2016 |
| CN | 105529830 | A | 4/2016 |
| JP | 2008-99448 | A | 4/2008 |

OTHER PUBLICATIONS

Chinese Office Action dated May 31, 2018 in Chinese Patent Application No. 201610943937.1 (with English translation), 10 pages.
Extended European Search Report dated Mar. 27, 2020 in corresponding European Patent Application No. 17868150.8, 8 pages.

* cited by examiner

ENERGY CONTROL METHOD AND APPARATUS FOR POWER CONSUMPTION SYSTEM

TECHNICAL FIELD

The present disclosure relates to the field of energy control, and more particularly to an energy control method and apparatus for a power consumption system.

BACKGROUND

There is no interaction of instruction information between power supply system and power consumption devices in the related art. Both allocation control of energy and protection of the grid are performed in a passive manner, such as switching off the power, tripping upon overcurrent and overload for protection, which has a great impact on the grid. Especially in the process of microgrid operation, the passive manner will likely cause greater fluctuations and shocks, or even damage.

SUMMARY

In view of this, an objective of the disclosure is to provide an energy control method and apparatus for a power consumption system, capable of guaranteeing the safety of the grid and achieving a stable and reliable operation.

According to an aspect of the disclosure, an energy control method for a power consumption system is provided.

An energy control method for a power consumption system to which power is supplied by a power supply system, wherein both the power supply system and the power consumption system are communicatively connected to an energy control apparatus, the power consumption system comprising at least one power consumption device, the energy control method comprising:

a step S100 in which the energy control apparatus receives a starting-up request signal to start up a power consumption device of the at least one power consumption device;

a step S200 of determining whether current power supply capacity of the power supply system meets a starting power requirement of the power consumption device to be started;

a step S300 of sending a starting-up signal to the power consumption device to be started and controlling the power supply system to supply power to the power consumption device to be started, if the current power supply capacity of the power supply system meets the starting power requirement of the power consumption device to be started;

wherein the energy control method continues to make a determination as to whether the current power supply capacity of the power supply system meets the starting power requirement of the power consumption device to be started, if the current power supply capacity of the power supply system does not meet the starting power requirement of the power consumption device to be started.

Preferably, the power consumption system comprises a plurality of power consumption devices with different priorities, and the energy control method further comprises:

a step S210 of determining whether, among power consumption devices in an operating state, there is an operating power consumption device with a lower priority than that of the power consumption device to be started, if it is determined in the step S200 that the starting power requirement of the power consumption device to be started is not met;

a step S220 of powering off the operating power consumption device with the lowest priority or reducing the power thereof, if there is an operating power consumption device with a lower priority than that of the power consumption device to be started;

wherein the energy control method returns to the step S200 after the step S220 or if it is determined in the step S210 that there is no operating power consumption device with a lower priority than that of the power consumption device to be started.

Preferably, a prompt signal as to whether or not to power off the operating power consumption device with the lowest priority or reduce the power thereof is sent, if it is determined in the step S210 that there is an operating power consumption device with a lower priority than that of the power consumption device to be started;

the step S220 is executed when a confirmation signal confirming to power off the operating power consumption device with the lowest priority or reduce the power thereof is received;

the energy control method returns to the step S200, if a negative confirmation signal, which indicates not to power off the operating power consumption device with the lowest priority or reduce the power thereof, is received or no feedback signal is received within a first predetermined time.

Preferably, a prompt signal indicating that, among the power consumption devices in the operating state, there is no power consumption device with a lower priority than that of the power consumption device to be started is sent, if it is determined in the step S210 that, among the power consumption devices in the operating state, there is no operating power consumption device with a lower priority than that of the power consumption device to be started; and the energy control method returns to the step S200.

Preferably, a prompt signal indicating that, among the power consumption devices in the operating state, there is no operating power consumption device with a lower priority than that of the power consumption device to be started is sent, if it is determined in the step S210 that, among the power consumption devices in the operating state, there is no operating power consumption device with a lower priority than that of the power consumption device to be started, and a prompt signal as to whether or not to force to start up the power consumption device is sent;

the step S300 is executed, if a confirmation signal confirming to force to start up the power consumption device is received, and the energy control method returns to the step S200, if a negative confirmation signal, which indicates not to force to start up the power consumption device, is received or no feedback signal is received within a second predetermined time.

Preferably, A determination whether the current power supply capacity of the power supply system meets a rated power requirement of the power consumption device to be started is made, if it is determined in the step S200 that the current power supply capacity of the power supply system does not meet the starting power requirement of the power consumption device to be started;

a prompt signal as to whether or not to force to start up the power consumption device is sent, if the current power supply capacity of the power supply system meets a rated power requirement of the power consumption device to be started; when a confirmation signal is received, the step S300 is executed; and the step S210 is executed, if a negative confirmation signal, which indicates not to force to start up the power consumption device, is received or no feedback signal is received within a third predetermined time, or if the current power supply capacity of the power supply system does not meet the rated power requirement of the power consumption device to be started.

Preferably, the energy control apparatus is further connected with a communication terminal, which sends the starting-up request signal to the energy control apparatus.

Preferably, signal transmission is made in a wireless, wired or power line carrier manner between the communication terminal and the energy control apparatus.

According to another aspect of the disclosure, an energy control apparatus for a power consumption system is provided.

The energy control apparatus for a power consumption system comprises:

a signal receiving module for receiving a starting-up request signal to start up a power consumption device;

a state information acquiring module for acquiring current power supply capacity of the power supply system that supplies power to the power consumption system and a starting power requirement of a power consumption device to be started;

a determining module for determining whether the current power supply capacity of the power supply system meets the starting power requirement of the power consumption device to be started;

a signal sending module for sending a starting-up signal to the power consumption device to be started if the current power supply capacity of the power supply system meets the starting power requirement of the power consumption device to be started; and an electric energy output control module for controlling the power supply system to supply power to the power consumption device to be started if the current power supply capacity of the power supply system meets the starting power requirement of the power consumption device to be started.

Preferably, the determining module is further used for determining, among power consumption devices in an operating state, whether there is an operating power consumption device with a lower priority than that of the power consumption device to be started, when the current power supply capacity of the power supply system does not meet the starting power requirement of the power consumption device to be started; and/or the signal sending module is further used for sending a power off signal to the operating power consumption device with the lowest priority, if, among the power consumption devices in the operating state, there is an operating power consumption device with a lower priority than that of the power consumption device to be started; and/or the electric energy output control module is further used for controlling the power supply system to stop supplying power to the operating power consumption device with the lowest priority or to reduce power quantity supplied to the operating power consumption device with the lowest priority, if, among the power consumption devices in the operating state, there is an operating power consumption device with a lower priority than that of the power consumption device to be started.

Preferably, the energy control apparatus further comprising a storage module for storing information on startup power and rated power of all power consumption devices in the power consumption system.

According to another aspect of the disclosure, a storage medium is further provided.

The storage medium comprises a program stored thereon, wherein the program executes the energy control method for a power consumption system according to any of the above items.

According to another aspect of the disclosure, a processor is further provided.

The processor runs a program, wherein the program executes the energy control method for a power consumption system according to any of the above items.

Preferably, the energy control apparatus is further connected with a communication terminal, which sends the starting-up request signal to the energy control apparatus, receives the prompt signal from the energy control apparatus, and/or sends the feedback signal to the energy control apparatus.

The energy control method for a power consumption system provided by the disclosure, by providing an energy control apparatus, establishes a communicative connection relation between the power supply system and the power consumption system, wherein it first determines whether the current power supply capacity of the power supply system meets the starting power requirement of a power consumption device to be started, when receiving a starting-up request signal of a power consumption device, and starts up the power consumption device, if the energy control apparatus further comprising a storage module for storing information on startup power and rated power of all power consumption devices in the power consumption system. An active control over the grid is realized by means of the energy control apparatus, to protect the safety of the grid and achieve the stable and reliable operation of the grid.

The energy control apparatus for a power consumption system provided by the disclosure can realize the active control over the grid, protect the safety of the grid and achieve the stable and reliable operation of the grid.

BRIEF DESCRIPTION OF THE DRAWINGS

The above and other objectives, features and advantages of the disclosure will be clearer through the description of the embodiments of the disclosure below with reference to the accompanying drawings.

DETAILED DESCRIPTION

Figure 1:
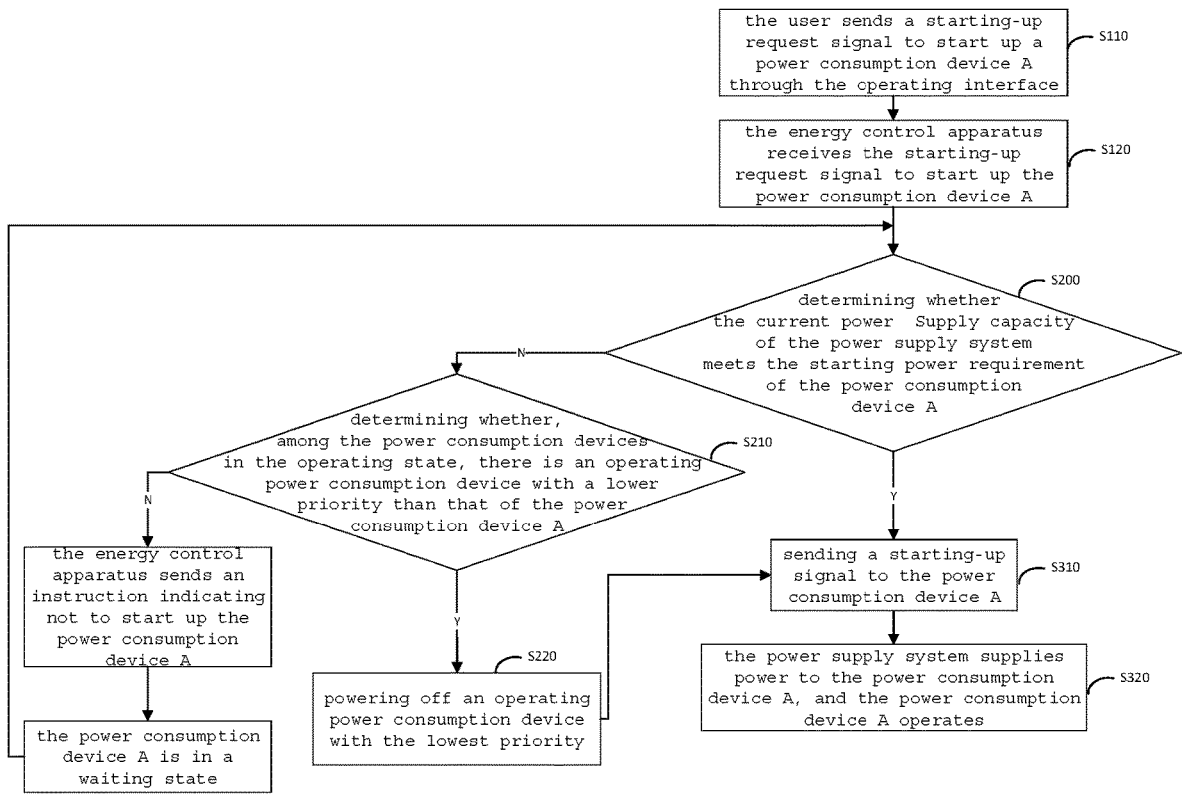
FIG. 1 is a flowchart showing an energy control method for a power consumption system provided according to an embodiment of the disclosure.

The following is a description of the disclosure based on embodiments, but the disclosure is not limited only to these embodiments. In the detailed description of the disclosure below, a number of specific details are described in detail. The disclosure can also be fully understood without the description of these details for those skilled in the art. In order to avoid confusing the essence of the disclosure, the well-known methods, processes, flows, components are not described in detail.

In addition, those skilled in the art should understand that, the drawings provided herein are for illustrative purposes and the drawings are not necessarily drawn to scale.

Unless expressly required in the context, similar terms such as "including" and "comprising" in the entire description and claims, should be interpreted as the meaning of inclusive rather than the meaning of exclusive or exhaustive; that is, it means "including but not limited to".

In the description of the disclosure, one should understand that the terms "first", "second" and so on are used only for descriptive purposes and cannot be understood as indicating or implying relative importance. In addition, in the description of the disclosure, unless otherwise stated, the meaning of "a plurality of" means two or more.

The disclosure provides an energy control method for a power consumption system to which power is supplied by a power supply system, wherein both the power supply system and the power consumption system are communicatively connected to an energy control apparatus. The power consumption system comprising at least one power consumption device. The energy control method comprises:

a step S100 in which the energy control apparatus receives a starting-up request signal to start up a power consumption device of the at least one power consumption device;

a step S200 of determining whether current power supply capacity of the power supply system meets a starting power requirement of the power consumption device to be started;

a step S300 of sending a starting-up signal to the power consumption device to be started and controlling the power supply system to supply power to the power consumption device to be started, if the current power supply capacity of the power supply system meets the starting power requirement of the power consumption device to be started;

wherein the energy control method continues to make a determination as to whether the current power supply capacity of the power supply system meets the starting power requirement of the power consumption device to be started, if the current power supply capacity of the power supply system does not meet the starting power requirement of the power consumption device to be started.

The energy control method for a power consumption system provided by the disclosure, by providing an energy control apparatus, establishes a communicative connection relation between the power supply system and the power consumption system. The energy control method first determines whether the current power supply capacity of the power supply system meets the starting power requirement of a power consumption device to be started, when a starting-up request signal of a power consumption device is received. The energy control method starts up the power consumption device, if the current power supply capacity of the power supply system meets the starting power requirement of a power consumption device to be started. An active control over the grid is realized by means of the energy control apparatus, to protect the safety of the grid and achieve the stable and reliable operation of the grid. Of course, the communication terminal can also be a tablet computer, a monitor and other devices with a communication function. In addition, the starting-up request signal and feedback signal sent by a user can be identified by detecting the user's actions.

Specifically, in the step S110, the starting-up request signal can be sent through a communication terminal communicatively connected to the energy control apparatus, on which the user can operate. In addition, the communication terminal is also used for receiving a prompt signal sent by the energy control apparatus, and sending a feedback signal to the energy control apparatus. The transmission of signals between the communication terminal and the energy control apparatus can be, but not limited to, the wireless, wired or power line carrier manner. The communication terminal, for example, can be a mobile phone. The mobile phone is loaded with an application program corresponding to the energy control method, so that the sending of the starting-up request signal can be achieved on the operating interface of the mobile phone.

In the step S200, the current power supply capacity of the power supply system refers to how much power can be further provided by power supply system under the premise that the power supply system supplies power to all operating power consumption devices in the operating state. Meeting the starting power requirement of the power consumption device to be started, refers to that the power supply system is able to further supply sufficient startup power to start up the power consumption device to be started, under the premise the power supply system supplies power to all operating power consumption devices in the operating state.

Further, the power consumption system comprises a plurality of power consumption devices with different priorities, that is, the plurality of power consumption devices have power consumption rights of different priorities, and the priorities of the power consumption devices can be ranked according to the degree of necessity.

In order to protect the security of the grid, the power consumption device cannot be started up immediately, if it is determined in the step S200 that the current power supply capacity of the power supply system does not meet the starting power requirement of the power consumption device to be started, and a further determination is needed, that is the step S210 is executed.

In the step S210, among the power consumption devices in the operating state, whether there is an operating power consumption device with a lower priority than that of the power consumption device to be started, is determined.

The step S220 is executed, if it is determined in the step S210 that there is an operating power consumption device with a lower priority than that of the power consumption device to be started.

It shows that the priority of the power consumption device to be started is lower than priorities of all the power consumption devices in the operating state, if it is determined in the step S210 that there is no operating power consumption device with a lower priority than that of the power consumption device to be started, then the power consumption device to be started will not be started up, be in a waiting state, and the energy control method returns to the step S200, i.e., continues to make determination as to whether the current power supply capacity of the power supply system meets the starting power requirement of the power consumption device to be started.

In the step S220, powering off the operating power consumption device with the lowest priority or reducing the power thereof refers to powering off the operating power consumption device with the least necessity to operate or reducing the power thereof. It could be understood that, too much power reduction will cause a damage to the operating power consumption device. Therefore, the operating powering consumption device with the lowest priority will be powered off directly, when the power of the operating power consumption device with the least priority must be reduced too much to meet the starting power of the power consumption device to be started; and the power of the operating power consumption device with lowest priority is reduced to meet the starting requirement of the power consumption device to be started, when the power of the operating power consumption device with the lowest priority is reduced not too much and a damage will not be caused.

The energy control method returns to the step S200 after the step S220, i.e., continues to make determination as to whether the current power supply capacity of the power consumption system meets the starting power requirement of the power consumption device to be started.

Further, the energy control method automatically proceeds to the step S200, after the power consumption device to be started is started up, to determine whether the current power supply capacity of the power supply system meets the starting power requirement of the just powered-off operating power consumption device with the lowest priority.

The just powered-off operating power consumption device with the lowest priority is re-started, if the current power supply capacity of the power supply system meets the starting power requirement of the just powered-off operating power consumption device with the lowest priority.

In a further preferred embodiment, a prompt signal as to whether or not to power off the operating power consumption device with the lowest priority or reduce the power thereof is sent, if it is determined in the step S210 that there is an operating power consumption device with a lower priority than that of the power consumption device to be started. The message of the prompt signal can be displayed on the communication terminal, asking the user how to proceed with the next step. The communication terminal sends a confirmation signal confirming the power off to the energy control apparatus, if the user chooses yes, and the step S220 is executed, when the confirmation signal confirming the power off is received. The communication terminal sends a negative confirmation signal to the energy control apparatus, if the user chooses no, and the step S200 is returned to, when the negative confirmation signal is received; the step S200 is returned, if the user does not feed back within a first predetermined time, that is, if a feedback signal is not received within the first predetermined time, i.e., the energy control method continues to make determination as to whether the current power supply capacity of the power supply system meets the starting power requirement of the power consumption device to be started. The manner of sending a prompt signal can avoid powering off the operating power consumption device with the lowest priority which the user does not intended to powered off. The first predetermined time is not limited, but can be set as needed, for example, 30 s-60 s.

In a further preferred embodiment, a prompt signal is sent indicating that among the power consumption devices in the operating state, there is no operating power consumption device with a lower priority than that of the power consumption device to be started, if it is determined in the step S210 that, among the power consumption devices in the operating state, there is no operating power consumption device with a lower priority than that of the power consumption device to be started. A message of the prompt signal can be displayed on the communication terminal, to let the user know why the power consumption device to be started is not started up. And the energy control method returns to the step S200, i.e., the energy control method continues to make a determination as to whether the current power supply capacity of the power consumption system meets the starting power requirement of the power consumption device to be started. The user can properly power off those operating power consumption devices without the need of operation and resend the starting-up request signal.

Even further, a prompt signal is sent indicating that among the power consumption devices in the operating state, there is no operating power consumption device with a lower priority than that of the power consumption device to be started, and a prompt signal as to whether or not to force to start up the power consumption device is sent, if it is determined in the step S210, among the power consumption devices in the operating state, there is no operating power consumption device with a lower priority than that of the power consumption device to be started. For example, a prompt as to whether or not to force to start up the power consumption device can be sent for the user's selection, when the current power supply capacity of the power supply system is as much as the starting power requirement of the power consumption device to be started, and starting up the power consumption device has no significant impact on the grid within the acceptable range of the grid. The step S300 is executed, if a confirmation signal is received. The energy control method returns to the step S200, if a negative confirmation signal is received or no feedback signal is received within a second predetermined time. i.e., the energy control method continues to make a determination as to whether the current power supply capacity of the power supply system meets the starting power requirement of the power consumption device to be started. The second predetermined time is not limited, but can be set as needed, for example, 30 s-60 s.

In another preferred embodiment, the energy control method determines whether the current power supply capacity of the supply system meets the rated power requirement of the power consumption device to be started, if it determined in the step S200 that the current power supply capacity of the power supply system does not meet the starting power requirement of the power consumption device to be started. Generally, the starting power of the power consumption device is greater than the rated power in the normal operation of the power consumption device. Therefore, the normal operation will not affect the grid, if the current power supply capacity of the power supply system can meet the rated power of the power consumption device to be started, although starting up the power consumption device will borrow the power of other power consumption devices in the operating state. Therefore, a prompt signal as to whether or not to force to start up the power consumption is sent for the user's selection, if the current power supply capacity of the power supply system can meet the rated power requirement of the power consumption device to be started. The step S300 is executed, if a confirmation signal is received from the user. The energy control method returns to step S210, if a negative confirmation signal is received or no feedback signal is received within a third predetermined time, or if the current power supply capacity of the power supply system cannot meet the rated power requirement of the power consumption device to be started. The third predetermined time is not limited, but can be set as needed, for example, 30 s-60 s.

In summary, the energy control method for a power consumption system provided by the disclosure is applied to energy control of the grid, especially to a microgrid system, which refers to a household power consumption system, or a new energy microgrid system such as a photovoltaic power generation and consumption system. In the microgrid system, it is assumed that the power supply capacity of the power supply system is limited, e.g., the current power of home access lines of the household power consumption is limited, or the maximum power of the new energy microgrid system is limited. In a microgrid system, a sum of the power of all power consumption devices may exceed the maximum power of the power supply. In fact, it is also a system design waste if the system is designed such that the sum of the power of the power consumption devices is equal to the maximum power of the power supply, because not all the power consumption devices are started up at the same time. The energy control method provided by the disclosure controls the sum of the power of the current power consumption devices, makes it match the power supply capacity of the power supply system to realize the coordinated and balanced operation between the power supply system and the power consumption devices in the microgrid, and thereby ensures the safe and reliable operation of the microgrid system.

A specific embodiment for a control method is given below in combination with FIG. 1. The energy control method comprises steps S110-S320.

At step S110, the user sends a starting-up request signal to start up a power consumption device A through the operating interface.

At step S120, the energy control apparatus receives the starting-up request signal to start up the power consumption device A.

At step S200, whether the current power supply capacity of the power supply system meets the starting power requirement of the power consumption device A is determined.

At step S210, whether, among the power consumption devices in the operating state, there is an operating power consumption device with a lower priority than that of the power consumption device A is determined, if the current power supply capacity of the power supply system does not meet the starting power requirement of the power consumption device A.

The energy control apparatus sends an instruction indicating not to start up the power consumption device A, and the power consumption device A is in a waiting state, if there is no operating power consumption device with a lower priority than that of the power consumption device. And the energy control method returns to the step S200;

At step S220, an operating power consumption device with the lowest priority is powered off, if there is an operating power consumption device with a lower priority than that of the power consumption device.

At step S310, a starting-up signal to the power consumption device A is sent, if the current power supply capacity of the power supply system meets the starting power requirement of the power consumption device A or after the step S220.

At step S320, the power supply system supplies power to the power consumption device A, and the power consumption device A operates.

Figure 2:
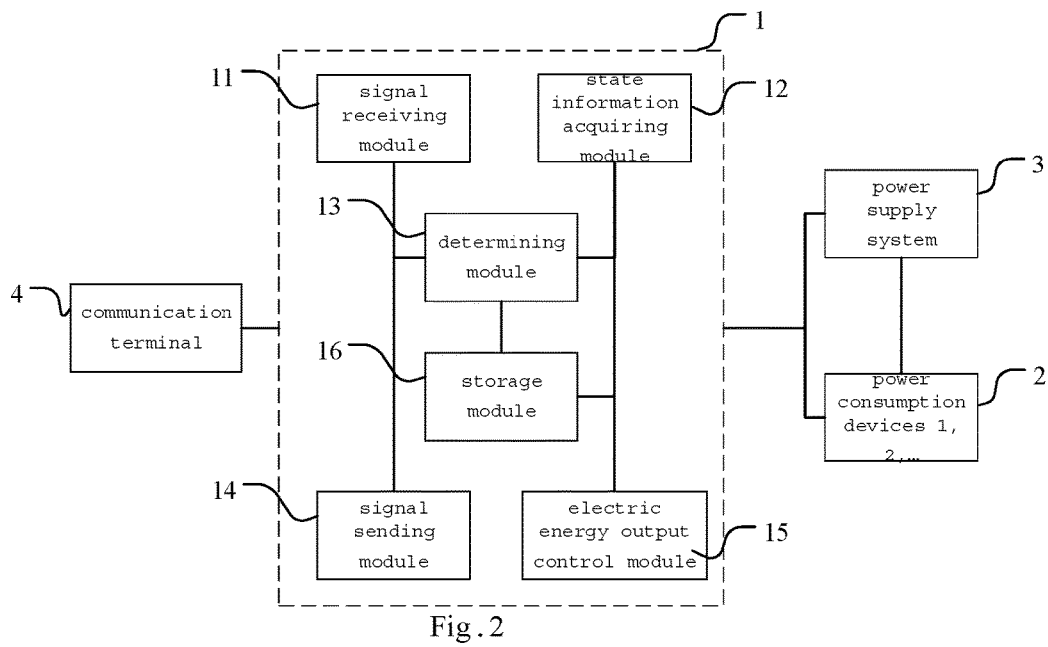
FIG. 2 is a schematic diagram showing a structure of an energy control apparatus for a power consumption system provided according to an embodiment of the disclosure.

Further, the disclosure further provides an energy control apparatus for a power consumption system. As shown in FIG. 2, the energy control apparatus 1 comprises a signal receiving module 11, a state information acquiring module 12, a determining module 13, a signal sending module 14, and an electric energy output control module 15. The signal receiving module 11 is used for receiving a starting-up request signal to start up a power consumption device 2, sent by a communication terminal 4. The state information acquiring module 12 is used for acquiring a current power supply capacity of the power supply system 3 that supplies power to the power consumption system and a starting power requirement of a power consumption device to be started. The determining module 13 is used for determining whether the current power supply capacity of the power supply system 3 meets the starting power requirement of the power consumption device to be started. The signal sending module 14 is used for sending a starting-up signal to the power consumption device to be started if the current power supply capacity of the power supply system 3 meets the starting power requirement of the power consumption device to be started. And The electric energy output control module 15 is used for controlling the power supply system 3 to supply power to the power consumption device to be started if the current power supply capacity of the power supply system 3 meets the starting power requirement of the power consumption device to be started.

It should be noted that, the signal receiving module 11, the state information acquiring module 12, the determining module 13, the signal sending module 14, and the electric energy output control module 15 may operate in a computer terminal as apart of the apparatus. Functions of the modules can be performed by a processor in the computer terminal. And the computer terminal may be terminal devices such as smart phones (e.g., Android phones, iOS phones), tablet computers, laptop computer, and Mobile Internet Devices (MIDs), PADs.

Further, the modules of the energy control apparatus 1 are also used for performing the various control methods described above. The signal receiving module 11 receives signals from the communication terminal 4, such as instructions and feedback signals from the communication terminal 4, etc. The signal sending module 14 is used for sending signals to the communication terminal 4 and the power consumption device 2. For example, The signal sending module 14 is used for sending control instructions, start-up and power-off instructions and the message of a prompt signal, etc. The determining module 13 is used for comparing and judging various parameters. The electric power output control module 15 is used for controlling the power supply system 3 to supply power or not for the user consumption device 2. For example, the determining module 13 is further used for determining, among the power consumption devices in the operating state, whether there is an operating power consumption device with a lower priority than that of the power consumption device to be started, when the current power supply capacity of the power supply system 3 does not meet the starting power requirement of the power consumption device to be started. The signal sending module 14 is further used for sending a signal to power off the operating power consumption device with the lowest priority, if, among the power consumption devices in the operating state, there is an operating power consumption device with a lower priority than that of the power consumption device to be started. The electric energy output control module 15 is further used for controlling the power supply system 3 to stop supplying power to the operating power consumption device with the lowest priority or to reduce a quantity of power supplied to the operating power consumption device with the lowest priority, etc., if, among the power consumption devices in the operating state, there is an operating power consumption device with a lower priority than that of the power consumption device to be started.

Further, the energy control apparatus further comprises a storage module 16, for storing information such as the starting power, the rated power of all power consumption devices 2 in the power consumption system. Of course, the storage module may not be provided, but the communication terminal 4 sends the information of the power consumption device 2 to the energy control apparatus 1 each time.

It should be stated here that, the various functional units provided in the embodiment of the disclosure can run in mobile terminals, computer terminals or similar computing devices, or can be stored as part of the storage medium.

Thus, the embodiment of the disclosure can provide a computer terminal, which can be any one computer terminal device in a computer terminal group. Alternatively, in this embodiment, the computer terminal can also be replaced with a terminal device such as a mobile terminal.

Alternatively, in this embodiment, the computer terminal can be at least one of a plurality of network devices located in a computer network.

In this embodiment, the computer terminal can execute program codes in the following steps of the energy control method for a power consumption system: a step S100 in which the energy control apparatus receives a starting-up request signal to start up a power consumption device; a step S200 of determining whether a current power supply capacity of the power supply system meets a starting power requirement of the power consumption device to be started; a step S300 of sending a starting-up signal to the power consumption device to be started and controlling the power supply system to supply power to the power consumption device to be started, if the current power supply capacity of the power supply system meets the starting power requirement of the power consumption device to be started; wherein the energy control method continues to make a determination as to whether the current power supply capacity of the power supply system meets the starting power requirement of the power consumption device to be started, if the current power supply capacity of the power supply system does not meet the starting power requirement of the power consumption device to be started.

Alternatively, the computer terminal can include one or more processors, a memory, and a transmission apparatus.

The memory can be used for storing software programs and modules, such as the program instructions/modules corresponding to the energy control method and apparatus for a power consumption system in the embodiment of the disclosure. The processor performs various functional applications and data processing by running the software programs and modules stored in the memory, to implement the energy control method for a power consumption system. The memory can include a high-speed random memory, as well as a non-volatile memory such as one or more magnetic storage devices, flash memory, or other non-volatile solid-state memory. In some instances, the memory can further include memories remotely arranged relative to the processor. And these remote memories can be connected to the terminal over the network. Examples of these networks include, but are not limited to, Internet, intranet, local area network, mobile communication network and a combination thereof.

The transmission apparatus is used for receiving or transmitting data over a network. Specific examples of the network can include a wired network and a wireless network. In one instance, the transmission apparatus includes a network adapter (Network Interface controller, NIC) that is connected to a router via network cables and other network devices so as to communicate with the Internet or LAN. In one instance, the transmission apparatus is a radio frequency (RF) module that is used for communicating wirelessly with the Internet.

Specifically, the memory is used for storing information about preset action conditions and preset authorized users, as well as application programs.

The processor can invoke the information and the application programs stored in the memory through the transmission apparatus, to perform the program codes of the method steps of various alternative or preferred implementations in the above method embodiment.

Those skilled in the art would appreciate that, the computer terminal may also be terminal devices such as smart phones (e.g., Android phones, iOS phones), tablet computers, laptop computer, and Mobile Internet Devices (MIDs), PADs.

Those skilled in the art would appreciate that, all or partial steps in the various methods of the above embodiments can be executed by the program instructing the terminal device related hardware. The program can be stored in a computer readable storage medium. And the storage medium can include: a flash disk, a read-only memory (ROM), a random access memory (RAM), a magnetic disk, or an optic disk, and so on.

An embodiment of the present disclosure further provides a storage medium. Alternatively, in this embodiment, the storage medium can be used for storing program codes executed by the energy control method for a power consumption system provided by the above method embodiment and apparatus embodiment.

Alternatively, in this embodiment, the storage medium can be located in any computer terminal in a computer terminal group in the computer network, or in any mobile terminal in a mobile terminal group.

Alternatively, in this embodiment, the storage medium is arranged to store program codes of the following steps: a step S120 in which the energy control apparatus receives a starting-up request signal to start up a power consumption device; a step S200 of determining whether a current power supply capacity of the power supply system meets a starting power requirement of the power consumption device to be started; and a step S300 of sending a starting-up signal to the power consumption device to be started and controlling the power supply system to supply power to the power consumption device to be started, if the current power supply capacity of the power supply system meets the starting power requirement of the power consumption device to be started; wherein the energy control method continues to make a determination as to whether the current power supply capacity of the power supply system meets the starting power requirement of the power consumption device to be started.

Alternatively, in this embodiment, the storage medium is further arranged to store program codes of the various preferred or alternative method steps provided by the energy control method for a power consumption system.

An embodiment of the disclosure further provides a processor. Alternatively, in this embodiment, the processor can be used for running a program, which executes program codes executed by the energy control method for a power consumption system provided by the method embodiment and apparatus embodiment when running.

Alternatively, in this embodiment, the processor is arranged to execute program codes of the following steps: a step S120 in which the energy control apparatus receives a starting-up request signal to start up a power consumption device; a step S200 of determining whether a current power supply capacity of the power supply system meets a starting power requirement of the power consumption device to be started; and a step S300 of sending a starting-up signal to the power consumption device to be started and controlling the power supply system to supply power to the power consumption device to be started, if the current power supply capacity of the power supply system meets the starting power requirement of the power consumption device to be started; wherein the energy control method continues to make a determination as to whether the current power supply capacity of the power supply system meets the starting power requirement of the power consumption device to be started.

Alternatively, in this embodiment, the processor is further arranged to execute program codes of the various preferred or alternative method steps provided by the energy control method for a power consumption system.

The energy control method and apparatus for a power consumption system according to the disclosure have been described by way of examples with reference to the drawings. However, those skilled in the art would appreciate that, various improvements can also be made on the energy control method and apparatus for a power consumption system proposed in the disclosure, without departing from the disclosure of the disclosure. Therefore, the scope of protection of the disclosure shall be determined by the attached claims.

It is easy for those skilled in the art to understand that, the above preferred solutions can be freely combined and superimposed without conflicts.

It should be understood that, the above embodiments are merely illustrative instead of restrictive, and those skilled in the art can make a variety of obvious or equivalent modifications or replacements to the above details without departing from the basic principle of the disclosure, and all these modifications and replacements will be included in the scope of the claims of the disclosure.

What is claimed is:

1. An energy control method for a power consumption system, to which power is supplied by a power supply system, wherein both the power supply system and the power consumption system are communicatively connected to an energy control apparatus, the power consumption system comprising a plurality of power consumption devices with different priorities, the energy control method comprising:
   a step S100 in which the energy control apparatus receives a starting-up request signal to start up a power consumption device of the plurality of power consumption devices;
   a step S200 of determining whether current power supply capacity of the power supply system meets a starting power requirement of the power consumption device to be started;
   a step S300 of sending a starting-up signal to the power consumption device to be started and controlling the power supply system to supply power to the power consumption device to be started, if the current power supply capacity of the power supply system meets the starting power requirement of the power consumption device to be started;
   wherein the energy control method further comprises:
   a step 210 of determining, among power consumption devices in an operating state, whether there is an operating power consumption device with a lower priority than that of the power consumption device to be started, if the starting power requirement of the power consumption device to be started is not met;
   a step 220 of powering off the operating power consumption device with the lowest priority or reducing the power thereof, if there is an operating power consumption device with a lower priority than that of the power consumption device to be started; and
   sending a prompt signal indicating that, among the power consumption devices in the operating state, there is no power consumption device with a lower priority than that of the power consumption device to be started, if it is determined that, among the power consumption devices in the operating state, there is no operating power consumption device with a lower priority than that of the power consumption device to be started,
   wherein the energy control method returns to the step S200 after the step S220 or if it is determined in the step S210 that there is no operating power consumption device with a lower priority than that of the power consumption device to be started.

2. The energy control method according to claim 1, wherein:
   a prompt signal as to whether or not to power off the operating power consumption device with the lowest priority or reduce the power thereof is sent, if it is determined in the step S210 that there is an operating power consumption device with a lower priority than that of the power consumption device to be started;
   the step S220 is executed when a confirmation signal confirming to power off the operating power consumption device with the lowest priority or reduce the power thereof is received;
   the energy control method returns to the step S200, if a negative confirmation signal, which indicates not to power off the operating power consumption device with the lowest priority or reduce the power thereof, is received or no feedback signal is received within a first predetermined time.

3. The energy control method according to claim 1, wherein:
   a prompt signal indicating that, among the power consumption devices in the operating state, there is no operating power consumption device with a lower priority than that of the power consumption device to be started is sent, if it is determined in the step S210 that, among the power consumption devices in the operating state, there is no operating power consumption device with a lower priority than that of the power consumption device to be started, and a prompt signal as to whether or not to force to start up the power consumption device is sent;
   the step S300 is executed, if a confirmation signal confirming to force to start up the power consumption device is received, and
   the energy control method returns to the step S200, if a negative confirmation signal, which indicates not to force to start up the power consumption device, is received or no feedback signal is received within a second predetermined time.

4. The energy control method according to claim 1, wherein:
   a determination as to whether the current power supply capacity of the power supply system meets a rated power requirement of the power consumption device to be started is made, if it is determined in the step S200 that the current power supply capacity of the power supply system does not meet the starting power requirement of the power consumption device to be started;
   a prompt signal as to whether or not to force to start up the power consumption device is sent, if the current power supply capacity of the power supply system meets a rated power requirement of the power consumption device to be started;
   the step S300 is executed when a confirmation signal is received; and
   the step S210 is executed, if a negative confirmation signal, which indicates not to force to start up the power consumption device, is received or no feedback signal is received within a third predetermined time, or if the current power supply capacity of the power supply system does not meet the rated power requirement of the power consumption device to be started.

5. The energy control method according to claim 1, wherein the energy control apparatus is further connected with a communication terminal, which sends the starting-up request signal to the energy control apparatus.

6. The energy control method according to claim 5, wherein signal transmission is made in a wireless, wired or power line carrier manner between the communication terminal and the energy control apparatus.

7. An energy control apparatus for a power consumption system, comprising:
a signal receiving module for receiving a starting-up request signal to start up a power consumption device;
a state information acquiring module for acquiring current power supply capacity of a power supply system that supplies power to the power consumption system comprising a plurality of power consumption devices with different priorities and a starting power requirement of a power consumption device to be started;
a determining module for determining whether the current power supply capacity of the power supply system meets the starting power requirement of the power consumption device to be started;
a signal sending module for sending a starting-up signal to the power consumption device to be started if the current power supply capacity of the power supply system meets the starting power requirement of the power consumption device to be started; and
an electric energy output control module for controlling the power supply system to supply power to the power consumption device to be started if the current power supply capacity of the power supply system meets the starting power requirement of the power consumption device to be started, wherein:
the determining module is further used for determining, among power consumption devices in an operating state, whether there is an operating power consumption device with a lower priority than that of the power consumption device to be started, when the current power supply capacity of the power supply system does not meet the starting power requirement of the power consumption device to be started,
the signal sending module is further used for sending a prompt signal indicating that, among the power consumption devices in the operating state, there is no power consumption device with a lower priority than that of the power consumption device to be started, if it is determined that, among the power consumption devices in the operating state, there is no operating power consumption device with a lower priority than that of the power consumption device to be started, and
the electric energy output control module is further used for controlling the power supply system to stop supplying power to the operating power consumption device with the lowest priority or to reduce power quantity supplied to the operating power consumption device with the lowest priority, if, among the power consumption devices in the operating state, there is an operating power consumption device with a lower priority than that of the power consumption device to be started.

8. The energy control apparatus according to claim 7, further comprising a storage module for storing information on startup power and rated power of all power consumption devices in the power consumption system.

9. An energy control apparatus comprising:
a memory; and
a processor coupled to the memory and configured to execute a program for a power consumption system, to which power is supplied by a power supply system, wherein both the power supply system and the power consumption system are communicatively connected to an energy control apparatus, the power consumption system comprising a plurality of power consumption devices with different priorities by the processor being configured to
receive, at the energy control apparatus, a starting-up request signal to start up a power consumption device of the plurality of power consumption devices,
determine whether current power supply capacity of the power supply system meets a starting power requirement of the power consumption device to be started,
send a starting-up signal to the power consumption device to be started and controlling the power supply system to supply power to the power consumption device to be started, if the current power supply capacity of the power supply system meets the starting power requirement of the power consumption device to be started,
determine, among power consumption devices in an operating state, whether there is an operating power consumption device with a lower priority than that of the power consumption device to be started, if the starting power requirement of the power consumption device to be started is not met,
power off the operating power consumption device with the lowest priority or reducing the power thereof, if there is an operating power consumption device with a lower priority than that of the power consumption device to be started,
send a prompt signal indicating that, among the power consumption devices in the operating state, there is no power consumption device with a lower priority than that of the power consumption device to be started, if it is determined that, among the power consumption devices in the operating state, there is no operating power consumption device with a lower priority than that of the power consumption device to be started, and
return to the processer being configured to determine whether current power supply capacity of the power supply system meets the starting power requirement of the power consumption device to be started after the operating power consumption device is powered off or if it is determined that there is no operating power consumption device with the lower priority than that of the power consumption device to be started.

10. The energy control method according to claim 2, wherein the energy control apparatus is further connected with a communication terminal, which sends the starting-up request signal to the energy control apparatus, receives the prompt signal from the energy control apparatus, and/or sends the feedback signal to the energy control apparatus.

* * * * *